(12) United States Patent
Poddar et al.

(10) Patent No.: US 11,416,311 B2
(45) Date of Patent: Aug. 16, 2022

(54) STAGGERED SOFTWARE SYNCHRONIZATION

(71) Applicant: Nvidia Corporation, Santa Clara, CA (US)

(72) Inventors: Bimal Poddar, El Dorado Hills, CA (US); Donghan Ryu, Los Gatos, CA (US); Michael Gold, Santa Clara, CA (US); Samuel Reed Koser, Santa Clara, CA (US); Xiao Bo Zhao Zhang, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 87 days.

(21) Appl. No.: 17/089,978

(22) Filed: Nov. 5, 2020

(65) Prior Publication Data

US 2021/0240546 A1 Aug. 5, 2021

Related U.S. Application Data

(60) Provisional application No. 62/968,716, filed on Jan. 31, 2020.

(51) Int. Cl.
*G06F 9/46* (2006.01)
*G06F 9/52* (2006.01)

(52) U.S. Cl.
CPC ..................................... *G06F 9/52* (2013.01)

(58) Field of Classification Search
CPC ........................................................ G06F 9/52
See application file for complete search history.

*Primary Examiner* — Gregory A Kessler
(74) *Attorney, Agent, or Firm* — Hogan Lovells US LLP

(57) ABSTRACT

Approaches in accordance with various embodiments can reduce scheduling delays due to concurrent processing requests, as may involve VSyncs in multi-streaming systems. The software synchronization signals can be staggered relative to each other by offsetting an initial synchronization signal. These software synchronization signals can be readjusted over time such that each synchronization signal maintains the same relative offset, as may be with respect to other applications or containers.

21 Claims, 10 Drawing Sheets

| Instance | 1 | 2 | 3 | 4 | 5 | 6 | 7 | 8 |
|---|---|---|---|---|---|---|---|---|
| Offset | 0 | .5 | .25 | .75 | .125 | .625 | .375 | .875 |

STAGGERED SOFTWARE SYNCHRONIZATION

CROSS-REFERENCE TO RELATED APPLICATIONS

This application claims priority to U.S. Provisional Patent Application Ser. No. 62/968,716, filed Jan. 31, 2020, and entitled "Staggered Software VSync for Higher Quality of Service in Streaming Servers," which is hereby incorporated herein in its entirety for all purposes.

BACKGROUND

Recent streaming solutions have been proposed that feature servers which are each capable of streaming to multiple clients. According to proposed implementations, the processing units of the server have the capacity to support sixty-four or more simultaneous clients. This usage model allows customers with mobile devices to more fully interact with a server remotely. While the raw computational capacity of the processing units (e.g., a combination of central processing units (CPUs) and graphics processing units (GPUs)) may be enough to serve all the clients, the quality of service provided to individual clients may be inconsistent or less than desirable at certain instances due to many potentially contemporaneous requests for resources.

One prior approach uses container objects and runs an individual operating environment container for each client or end-user. The container may be a full operating system (OS), and the client would interact with the OS as if the client is interacting with a physical system rather than a container functioning as a virtual representation of a system. While the client may interact with the server as if it were a real, dedicated system, there may be multiple containers running on the system, and each of the containers may have a separate display framebuffer allocated for that container. Also, since the viewing of the content happens remotely, the OS container being executed on the server may not have an attached display. Despite not having an attached physical display, the conventional thinking of being able to run the game at 30 fps or 60 fps can work well. Otherwise a single container could fully occupy one or more of the processing units, running thousands of frames per second (fps) without any benefit to the client or end-user. To address this issue and allow all the components in the operating system to work seamlessly, a pseudo vertical synchronization ("VSync") signal is generated at a desired frame rate (e.g., 30/60 Hz).

Work performed on the processing units is driven by this VSync signal, which is true even in the case of a single GPU and/or single application attached to a physical monitor. In a typical, non-streaming system, upon the receipt of every VSync signal, a VSync operation is performed during which the rendering and displayable buffers are exchanged. The previous display buffer becomes "free" to be used to perform the "rendering" for the following frame. The exchange of the display and rendering buffers is done at VSync intervals to ensure tear-free animation. Once the rendering buffer becomes available, the OS and/or driver releases the application rendering loop to start composing the next frame of the animation.

While a software VSync works in a similar way, one issue with such an approach in multi-streaming systems is that since all the streaming containers are independently generating (and scheduling) their own VSyncs, the VSyncs can all align or can be very close to (within few milliseconds of) each other. This is also likely to happen because the containers may be executing the same code and their software synchronization scheduling computations might follow the same algorithm. If all the streaming containers schedule their VSync operations to be performed at the same time, then all the applications are unblocked at the same time and would begin composing their next frame at the same time. If the number of processors in the system is equal to the number of applications (such as in traditional one to one client-server configurations), this may still be fine. However, in multi-streaming solutions, there are generally far fewer processors than clients or application instances. As an example, there could be only eight CPUs serving sixty-four different clients. That means that there can be scenarios where there are not enough CPUs for scheduling all the application instances together, even though they should be all unblocked at the same time. This can lead to VSync notification being delayed for some containers. Additionally, applications in some containers are scheduled on the CPU much later than the software VSync, which can lead to situations where some applications may not be able to fully compose the frame before the next VSync, thereby resulting in a missed frame. This can lead to a jittery end-user experience.

BRIEF DESCRIPTION OF THE DRAWINGS

Various embodiments in accordance with the present disclosure will be described with reference to the drawings, in which.

DETAILED DESCRIPTION

Approaches in accordance with various embodiments can mitigate scheduling issues for multiple concurrent workloads. In at least one embodiment, this can include approaches to data or content streaming that enable streaming service providers to provide a higher and more consistent quality of end user experience to streaming clients by mitigating scheduling issues inherent to multi-streaming platforms. This can include, for example, staggering or offsetting synchronization signals, or providing offset or staggered commands based on one or more synchronization signals, for workloads or tasks that might otherwise attempt to be processed at, or near, the same time using a fixed set of processing resources.

Figure 1:
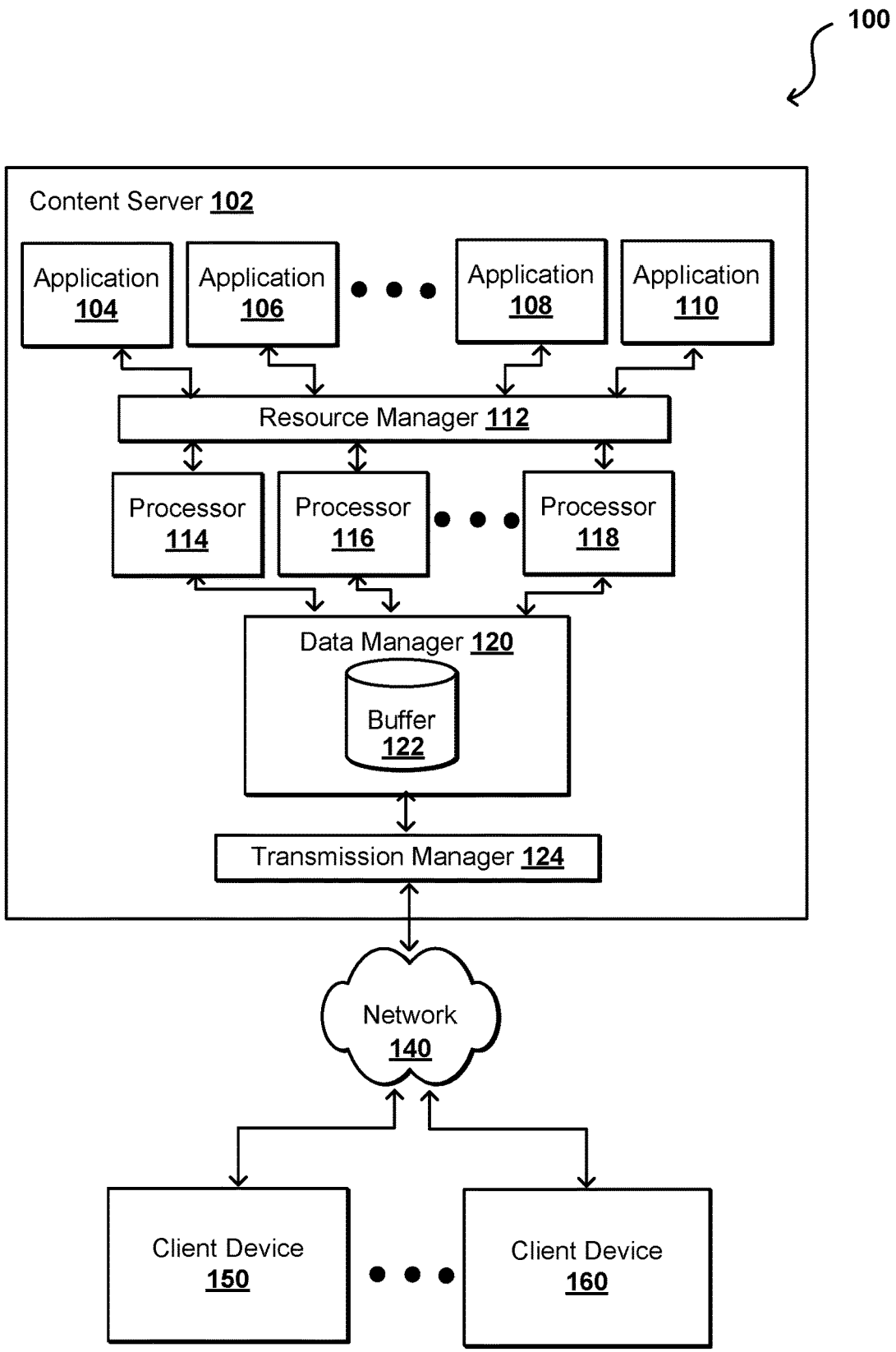
FIG. 1 illustrates a system for providing content, according to at least one embodiment.

FIG. 1 illustrates an example computer system 100 that can be used to implement aspects of various embodiments. In this example, a content server 102 can provide content to one or more client devices 150, 160 over at least one network 140. This content may be generated by one or more applications 104, 106, 108, 110, or instances of one or more applications. For example, there might be one application that provides content for each client device, but each client device might have a dedicated instance of that application, such as may run in an application container or virtual machine. In content server 102, there are a fixed number of processors 114, 116, 118 that can be used to perform tasks or process data for these applications. These processors can be any appropriate processing components, such as central processing units (CPUs), graphics processing units (GPUs), or combinations thereof. It should be understood that for simplicity sake that "application" can also refer to an instance of an application, or an "application instance," as used herein unless otherwise specifically stated. In operation, an application 104 may request performance of a task, where that request may be directed to a resource manager 112 that can select an available processor to perform that task. The request can then be sent to the selected processor, which can perform the task and generate appropriate output to be sent to the respective client device. In at least some applications, such as for graphics applications, the data may only be sent at specific intervals or points in time, such that the output may first be sent to a data manager 120 to be cached in a local buffer 122. At an appropriate time, this data can then be sent from the buffer to the respective client device, such as by streaming to that client device over the network(s) 140 as directed by a transmission manager 124 or other such system or service. In this example arrangement, the client devices may include various types of computing devices, as may include desktop computers, notebook computers, set-top boxes, streaming media players, gaming consoles, smartphones, tablet computers, virtual reality (VR) headsets, augmented reality (AR) goggles, wearable computers, or smart televisions. The network(s) 104 can include at least one wired or wireless network, as may include the Internet, an Ethernet, a local area network (LAN), a peer-to-peer network, a Bluetooth® connection, or a cellular network, among other such options.

In such a content server 102, it is possible that there may be more applications that require processing than there are processors to provide that processing. In such cases, a resource manager 112 can manage the distribution of tasks to processors based on various distribution or balancing algorithms or approaches, as may include a FIFO buffer or other such approach. If processors are available then these requests can be sent to processors for processing as those requests are received. When there are more concurrent or pending requests than can be handled by these processors, however, the resource manager may cause at least some of these requests to be delayed for processing until such processing capacity is available. If these tasks are time-critical, this may result in unacceptable or undesired performance degradation. For example, in graphics applications this may result in dropped frames when data for one or more frames cannot be completed in time, such as during a refresh period for a display device, as may correspond to the frame rate of that display device for one of the client devices.

Approaches in accordance with various embodiments can attempt to minimize scheduling delays due at least in part to the presence of multiple concurrent workloads on a system. As an example, such workloads may correspond to video frames to be transmitted to various client devices as part of a video game or content streaming service. As mentioned, new frames of content are displayed by various display devices at frame rates that are determined for the individual devices, such as 30, 60, or 90 frames per second (fps). In such an approach, content for a next frame must be received no later than the time for display of the next frame, which for 60 fps corresponds to a refresh period of about 16.67 ms. In various systems, this is accomplished by putting the video frame data in a buffer, then sending the frame data from that buffer at regular intervals, corresponding to the refresh period. This means both that the data must all be in the buffer by the next transmission time, and that data for a subsequent frame cannot be placed into the buffer until data for the prior frame has been transmitted from the buffer. Various systems manage this timing through use of a timing signal, such as a VSync signal, which is used to synchronize the frame rate of an application, such as a video game, and the refresh rate of the display monitor. VSync signals can be used to limit the frame rate output to the refresh rate of the display.

Figure 2:
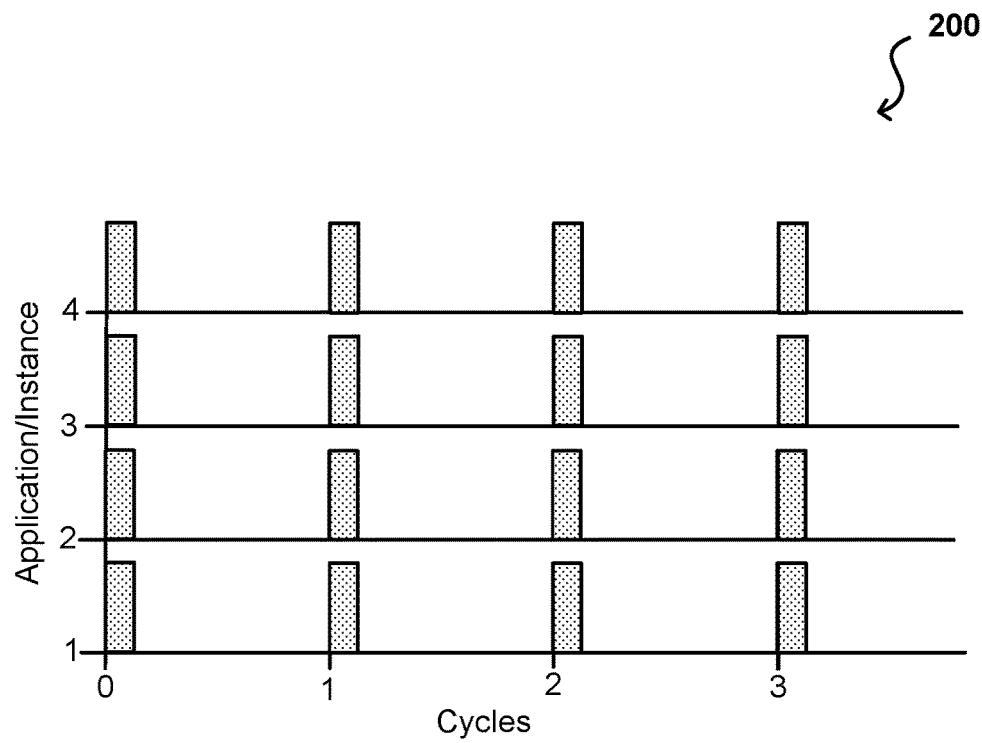
FIG. 2 illustrates example task synchronization, according to at least one embodiment.

In various situations, the time to process the data for a frame will be much less than the refresh time, such as may correspond to about 2 ms or 4 ms to process data within the 16.67 ms refresh time. In one potential scenario, the display devices could all be synchronized to the essentially the same time, such as where the VSync signals for the various displays are all received at substantially the same time. FIG. 2 illustrates a plot 200 of such a situation for a limited number of applications or instances. As mentioned, these tasks need not be graphics or video related, and can relate to any computerized task that may be performed at a specific time or interval, etc. In this example, each "cycle" can refer to a refresh period in a graphics context. If the synchronization signals are all similar, then the applications may all want to have their tasks performed at substantially the same time, which will be unable to be accomplished if the number of applications exceeds the number of processors available to handle those tasks. Even if only a subset of the applications are so synchronized, this can still result in the tasks exceeding processing capacity at various times, which can cause at least some of these tasks to be delayed. If any of these tasks are then delayed beyond the target result time, such as the next refresh period, then this can result in dropped or lost data, or other such performance issues.

In one example, a client application is released to do work near the beginning of a cycle and all clients may request to start executing at the same time. It should be noted is that it is not limited to clients that may want to run at the same time, as other parts in the system (e.g., an operating system window manager) may be driven by the same or similar events. There may be requests from four different containers lining up their execution as depicted. Since a resource manager may be single threaded, any request received for system resources (e.g., memory allocation) would cause the clients to have to wait on each other.

In at least some embodiments, a time-slicing approach can be utilized that can take advantage of the fact that there are portions within each refresh period for an application during which that application will generally not require processing capacity. In at least one embodiment, the synchronization signals can be staggered, or have offsets applied, such that at least some of these tasks can be started at different times, to reduce the amount of processing capacity needed as well as to smooth out the workload over time.

Figure 3:
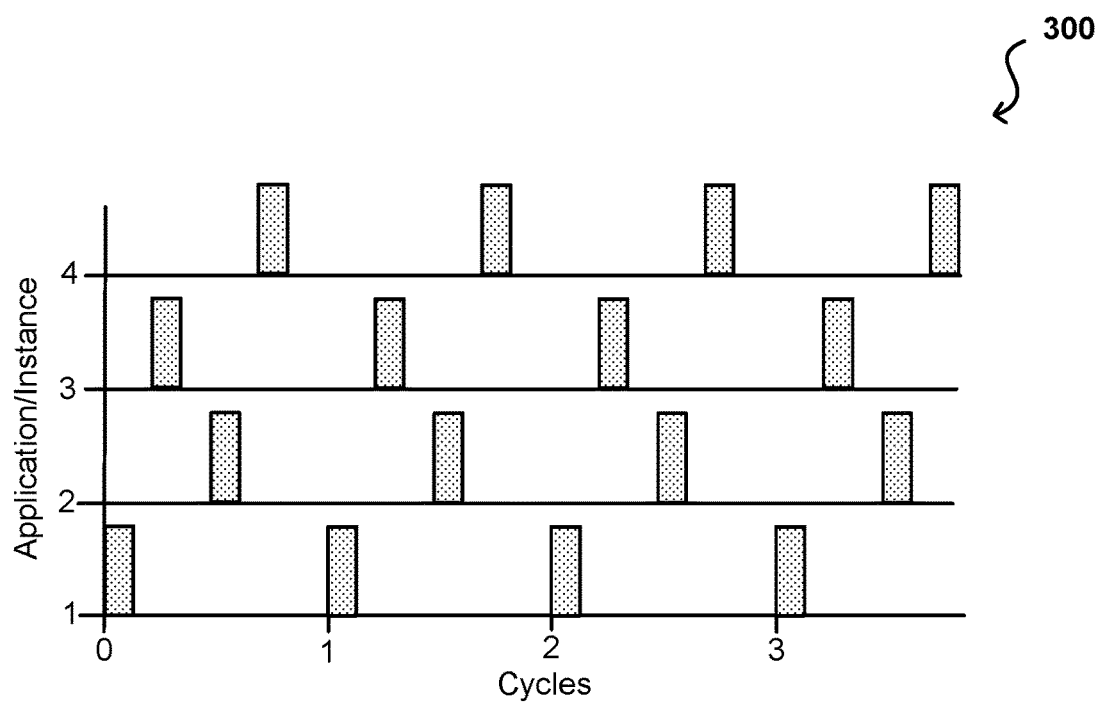
FIG. 3 illustrates staggered task synchronization, according to at least one embodiment.

FIG. 3 illustrates an example plot 300 of the workloads of FIG. 2, but with staggering applied. In this example plot, it can be seen that by staggering the synchronization signal for these applications, no two applications request to have their workloads processed at the same time. While delaying the processing in the approach of FIG. 2 may work in many situations, this staggering approach in FIG. 3 provides more control over the timing of the processing. While there may be some initial staggering of synchronization signals, the signals may drift over time and lose at least some of this staggering, which may result in applications still requesting work to be done at the same time.

In at least one embodiment, this can be used to minimize scheduling delays due to concurrent vertical synchronization signals, or "VSyncs," in multi-streaming systems. Embodiments include at least two aspects of note. A first aspect is to stagger the software VSyncs relative to each other by offsetting an initial VSync. A second aspect is to readjust the software VSyncs over time, such as continuously or periodically, such that each VSync maintains the same relative offset with respect to other applications, application containers, or other sources of processing tasks to be performed.

An example computation of when a VSync would be generated is when (currentTime % VSync_period) for various containers results in a zero value. If every container did the same exact computation, the timing of these computations would be all aligned. As mentioned, however, aligning of these tasks can lead to problems such as missed frames. Accordingly, at least one embodiment can add an offset to at least one software VSync time. As an example, if the next VSync time is computed as:

NextVSyncTime=(currentTime/displayPeriod)*displayPeriod+displayPeriod, then the VSync time for container N can be computed as follows:

Next VSyncTime_N=Next VSyncTime+offset_N where offset_N is chosen for the $N^{th}$ container to distribute the clients, and offset_N is computed uniquely for each container.

Different approaches for calculating such an offset can be utilized within the scope of various embodiments. One such approach utilizes a randomizer to determine random offsets, where the seed for a random number is to be initialized based on some data (e.g., a parameter) that is unique to the application, instance, or container (e.g. lowest bits of the current clock time). In such an approach, there would be no dependency of the clients on any global information.

An approach in accordance with another embodiment can calculate an initial offset by leveraging the observation that, since the number of clients is finite, a distribution can be achieved by staggering the clients and having a more predictable distribution, such as the distribution illustrated in FIG. 3. For example, if there were only two clients, then if the first client (with an instance ID of 0) was started at some time 0 at the beginning of the period, the second client (with an instance ID of 1) would ideally be started in the middle of the period, or ½ * period duration. With this timing, the two clients would be out of phase with each other with respect to timing within a given period. If a third client (with an instance ID of 2) is added, rather than attempting to adjust the offsets the third client can have an offset applied that places it in-between the first two clients, such as at ¼ * period duration. A fourth client could then similarly be added at ¾ * period duration. In such an approach, the spacing between the start times of the clients is automatically reduced without having to readjust the previous set of clients. In such an approach, each client can request an "instance ID" from a central resource manager or some other alternate means, and can use this instance ID to determine its offset. The computation of the offset can be done by leveraging the binary representation of the number as follows:

```
float fraction = 0.0;
float delta = 0.5;
for (uint32_t id = instanceId; id > 0; id >>= 1, delta *= 0.5) {
    fraction += (id & 0x1) * delta
}
```

Figures 4A, 4B:
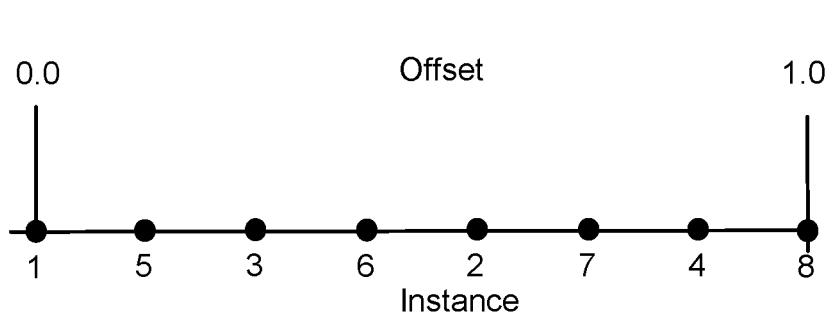
FIGS. 4A and 4B illustrate examples of synchronization signal staggering, according to at least one embodiment.

FIG. 4A illustrates a table 400 showing offsets for various instances, or instance IDs, using such an approach. As mentioned, in some embodiments these values can be pre-determined and identifiers assigned as appropriate.

FIG. 4B provides another plot 450 illustrating spacing and ordering of these instances over the duration of a cycle, according to the table of FIG. 4A. In at least one embodiment, such a "power of two" approach enables new streams to be dynamically added to the system at well-distributed positions in a VSync interval without affecting the scheduling of existing streams. As depicted in FIG. 4B, within a VSync interval (denoted as the range between 0.0 to 1.0), the first stream in the system may have a VSync signal transmitted at the earliest available slot, such as the start of the VSync interval (e.g., time=$t_1$). The second stream would have an offset at ½ of the VSync interval (e.g., time=$t_2$). Each subsequent stream that is added would be scheduled to receive a VSync signal at the halfway point between the largest remaining sub-interval between two scheduled VSyncs within the VSync interval.

In at least one embodiment, such a process can also attempt to maintain this phase shift between the clients. The initial offset can be remembered, where that offset may have been computed by random method or binary division or other such methods. Since this is a software-generated VSync signal, this signal may not be precise due to factors such as OS scheduling delays. If a process merely generates the next VSync at a period offset from the current position, due to drift over time these clients may eventually no longer be staggered. To maintain staggering, the initial offset can continue to be used in the two equations described previously to compute the next VSync. In at least one embodiment, a next VSync time can be computed by:

NextVSyncTime=(currentTime/displayPeriod)*displayPeriod+displayPeriod,

NextVSyncTime_N=Next VSyncTime+offset_N

Continuing to use the formula not just for initial sync but also for subsequent VSyncs ensures that the end-user experience does not degrade over time.

In at least one embodiment, such an approach can be used to enable a single server to concurrently stream content to multiple clients. In one embodiment, the CPU and GPU of a server can have sufficient capability to enable sixty-four or more simultaneous clients. This usage model can enable customers with mobile devices, for example, to interact with a gaming server remotely. While the raw horsepower of the CPU and GPU may be enough to serve all the clients, the quality of service to individual clients is extremely important and such a staggering approach can help to ensure this quality of service over time.

In at least one embodiment, a system can utilize Android container objects and run an individual Android container for each end-user or client device. The container can represent a fully operating Android system, with each of the containers having a separate display framebuffer allocated for that container. In at least some embodiments, management of task processing can involve use of a SurfaceFlinger for Android applications (or a display window manager (DWM) for Windows, etc.). A component such as a SurfaceFlinger can be responsible for compositing all the application and system surfaces into a single buffer that is to be provided for display on a client device, etc. Some embodiments can take advantage of a DiscSync module within SurfaceFlinger to periodically resync with the hardware. Leveraging such a module can prevent the system from having to send a VSync signal for every frame. In at least some embodiments, interfaces within SurfaceFlinger can be used to communicate VSync signals, and this signals can be generated using a hardware composer module in some embodiments to emulate the physical display signal. In at least some embodiments, these offsets will be relative to a system clock signal.

Since viewing of content happens remotely, an Android container would not have an attached display. Even though there is no attached physical display, the conventional thinking of being able to run the game at 30 fps or 60 fps can work well, as otherwise a single container could occupy the GPU fully running thousands of frames without any benefit to the end user. For all the components in the Android system to work seamlessly, a pseudo-VSync signal is generated at 30 Hz or 60 Hz, or another desired frame rate.

In at least one embodiment, the work done on the CPU and the GPU is driven by this VSync signal. This can be true even in the case of a single GPU or single application attached to a physical monitor. In a real system for a non-streaming system, at VSync the rendering and displayable buffers are exchanged. The previous display buffer becomes "free" to be used to "render" the following frame. Exchange of display and rendering buffer is done at VSync to ensure tear-free animation. Once the rendering buffer becomes available, the OS or driver releases the application rendering loop to start composing the next frame of the animation.

For the sequence of exchange of display and rendering buffer in the streaming architecture, one issue is that since all the streaming containers are generating their own VSync signals, the VSyncs can all align or can be within few milliseconds of each other. This is also likely to happen because the containers are executing the same code and their software sync computation might follow the same algorithm. If all the streaming containers generate their VSyncs at the same time, then all the applications are unblocked at the same time to start composing their next frame. If the number of processors in the system is equal to the number of applications, it may be still fine. However, in typical streaming solutions, there are many fewer CPUs than clients. As an example, there might be only eight CPUs serving sixty-four clients. That means that there are not enough CPUs for scheduling all the applications together even though they were all unblocked at the same time. This leads to some applications scheduled much later after the VSync and this can lead to situations where some applications may not be able to fully compose the frame before the next VSync. This can result in a missed frame, leading to a jittery end user experience.

As mentioned, however, such approaches can be used outside graphics and video applications, and can provide benefits for any system where tasks are assigned or scheduled for processing by one or more processors, particularly where a number of concurrent tasks may exceed the number of processors. For streaming workloads timing is important, such that streaming workloads may gain particular benefit from such approaches. In systems where hardware signals are typically used for synchronization, these signals can be emulated in software, which enables these signals to be staggered or have offsets applied to ensure at least some distribution of the timing of these signals. As mentioned, offsets can be applied for tasks from any appropriate source, such as an application, process, container, virtual machine, system, service, and the like.

Figure 5:
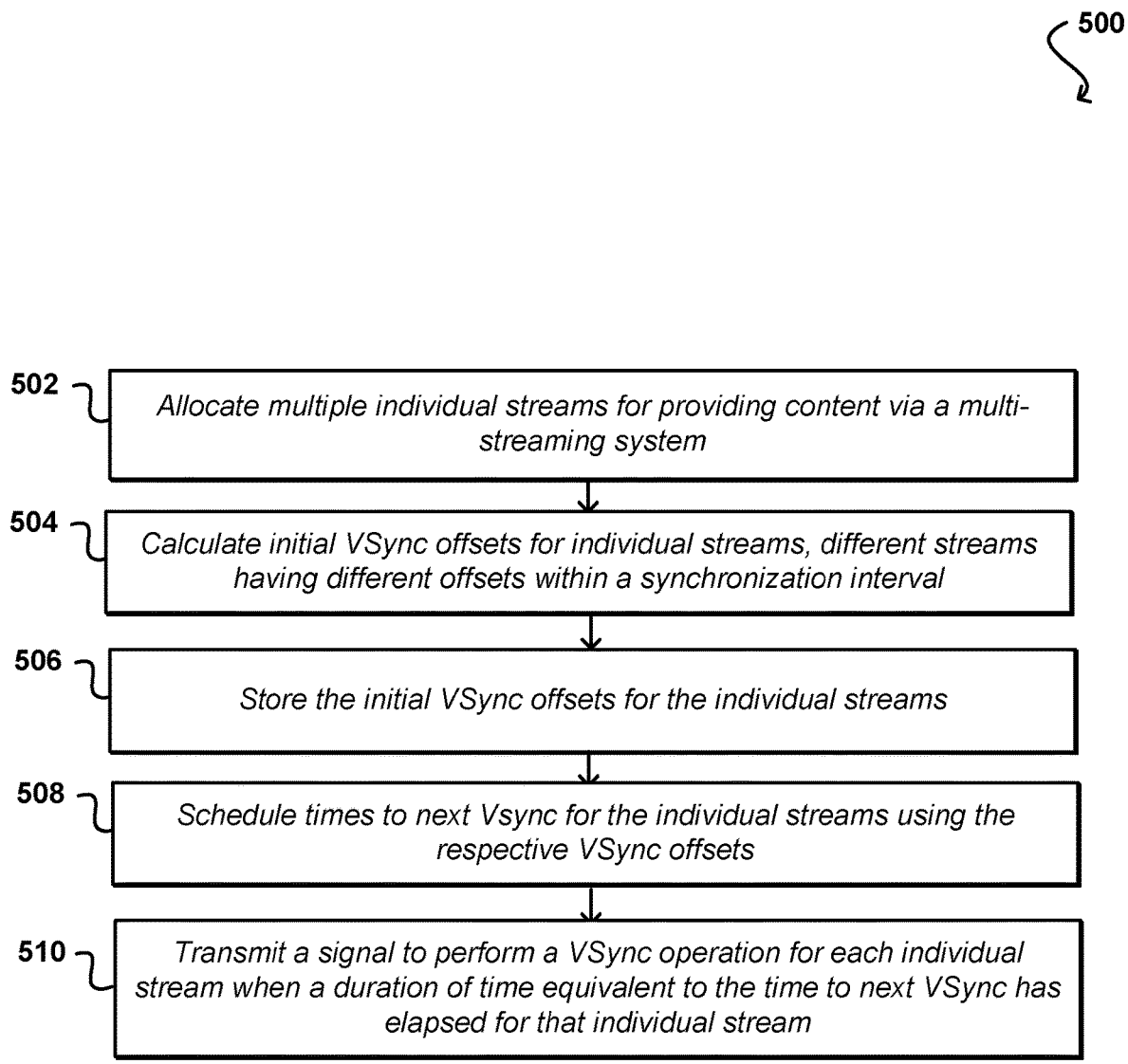
FIG. 5 illustrates a process for managing tasks for multiple streams, according to at least one embodiment.

FIG. 5 illustrates an example process 500 for managing scheduling in a multi-stream system that can be performed in accordance with various embodiments. It should be understood that for this and other processes presented herein that there can be additional, fewer, or alternative steps performed in similar or alternative order, or at least partially in parallel, within scope of various embodiments unless otherwise specifically stated. In this example, multiple individual streams are allocated 502 for providing content via a multi-streaming system. In at least one embodiment, each stream may transmit content to a different client device, and may also receive that content from a separate application, instance, or container as discussed herein. Initial offset values, such as initial VSync offsets, can be calculated 504 for these individual streams, where at least some of the different streams will have different offsets allocated within a synchronization interval. In at least one embodiment, each stream will have a unique offset. These initial VSync offsets can then be stored 506 for the individual streams. As appropriate, times to a next VSync can be scheduled 508 for the individual streams using the respective VSync offsets. For individual streams, a signal to perform a VSync operation can be transmitted 510 when a duration of time equivalent to the time to next VSync has elapsed for that individual stream.

Figure 6:
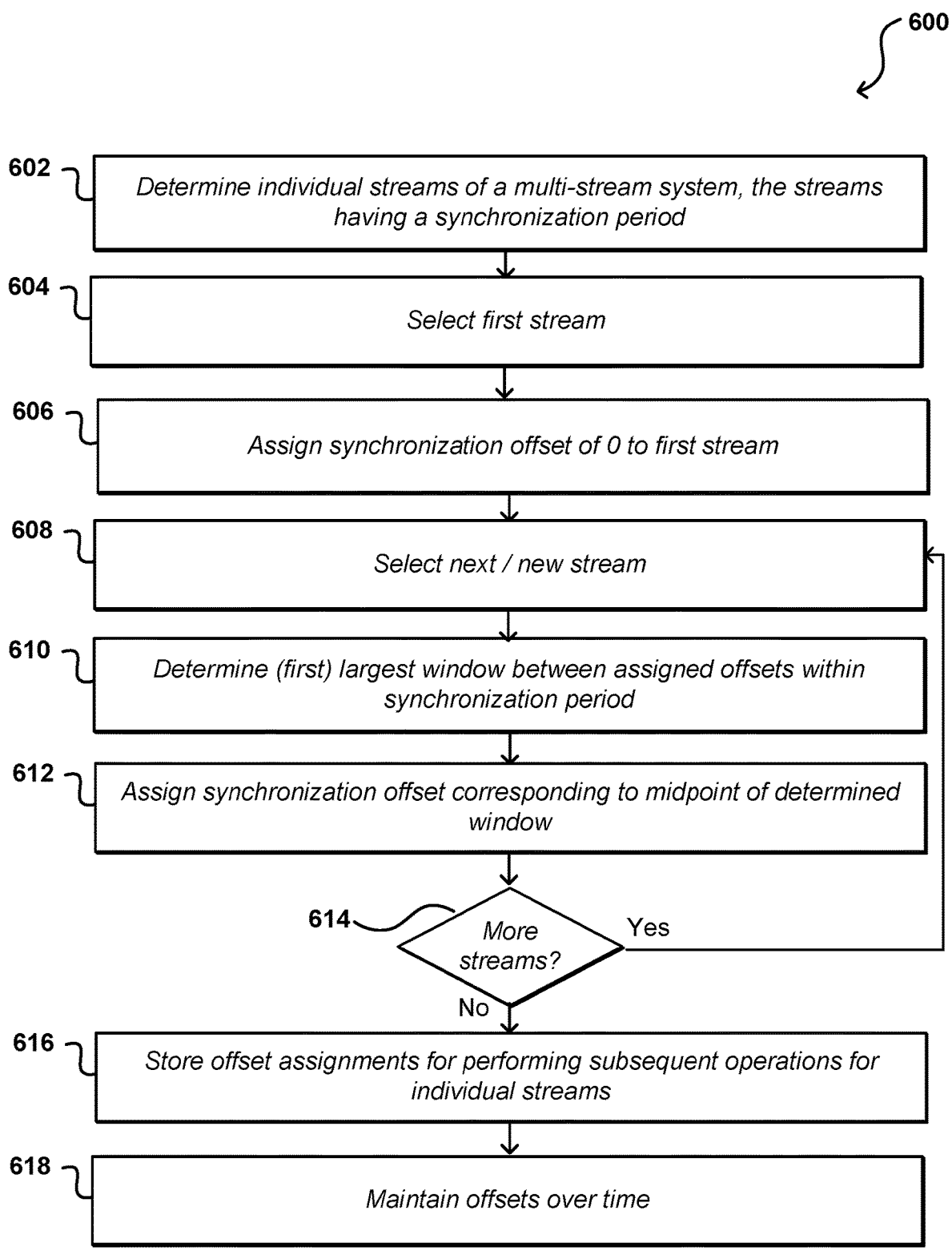
FIG. 6 illustrates a process for determining offsets for individual streams, according to at least one embodiment.

FIG. 6 illustrates an example process 600 that can be used to determine these offsets, in accordance with at least one embodiment. In this example, individual streams of a multi-stream system are determined 602, where those streams have a synchronization period. In order to assign offsets, such as VSync offsets, a first stream is selected 604 and a first offset assigned, in this case corresponding to 0 offset for the first stream. Offsets can be assigned for entities or objects other than streams, as may correspond to other communication channels or paths. For multiple streams, a next stream can be selected 608, where that next stream can be a newly added stream after other offsets have already been assigned. For this stream, the largest window between already assigned offsets within the synchronization period can be determined 610. If there is more than one such period, the process can select the first such period encountered. A synchronization offset can then be assigned 612 to this stream, where this offset corresponds to a midpoint of the determined window. A determination can be made 614 as to whether there are more streams to have offsets assigned, and if so then the process can continue for the next tread. As mentioned, this may occur when additional streams are added to the system for management. If all current streams have offsets assigned, then those offset assignments can be stored 616 for use in performing subsequent operations for those individual streams. As discussed herein, these offsets can be maintained 618 over time to account for drift or other such factors.

Data Center

Figure 7:
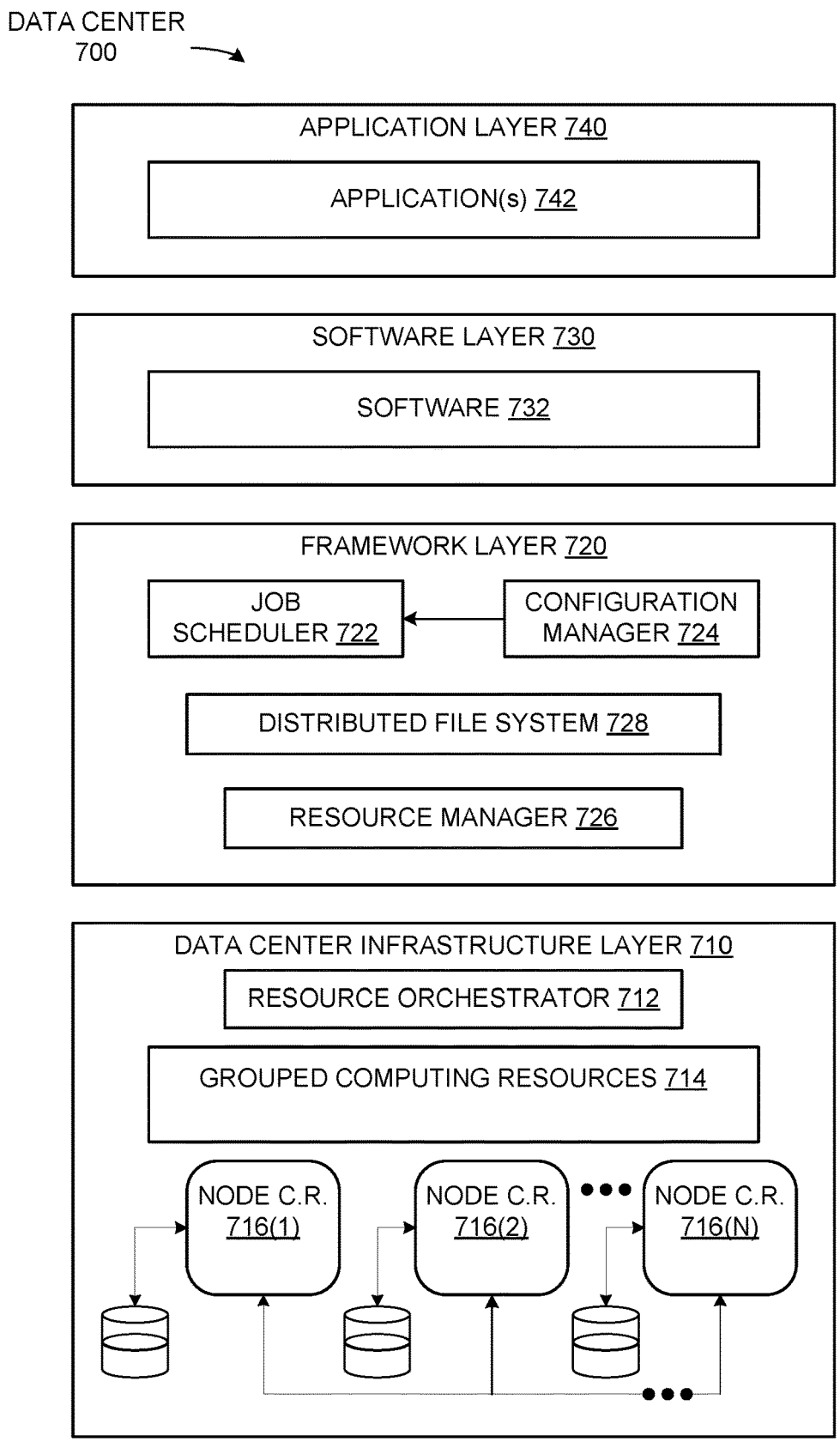
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to stagger synchronization signals in order to distribute workloads over a set of processors.

Computer Systems

Figure 8:
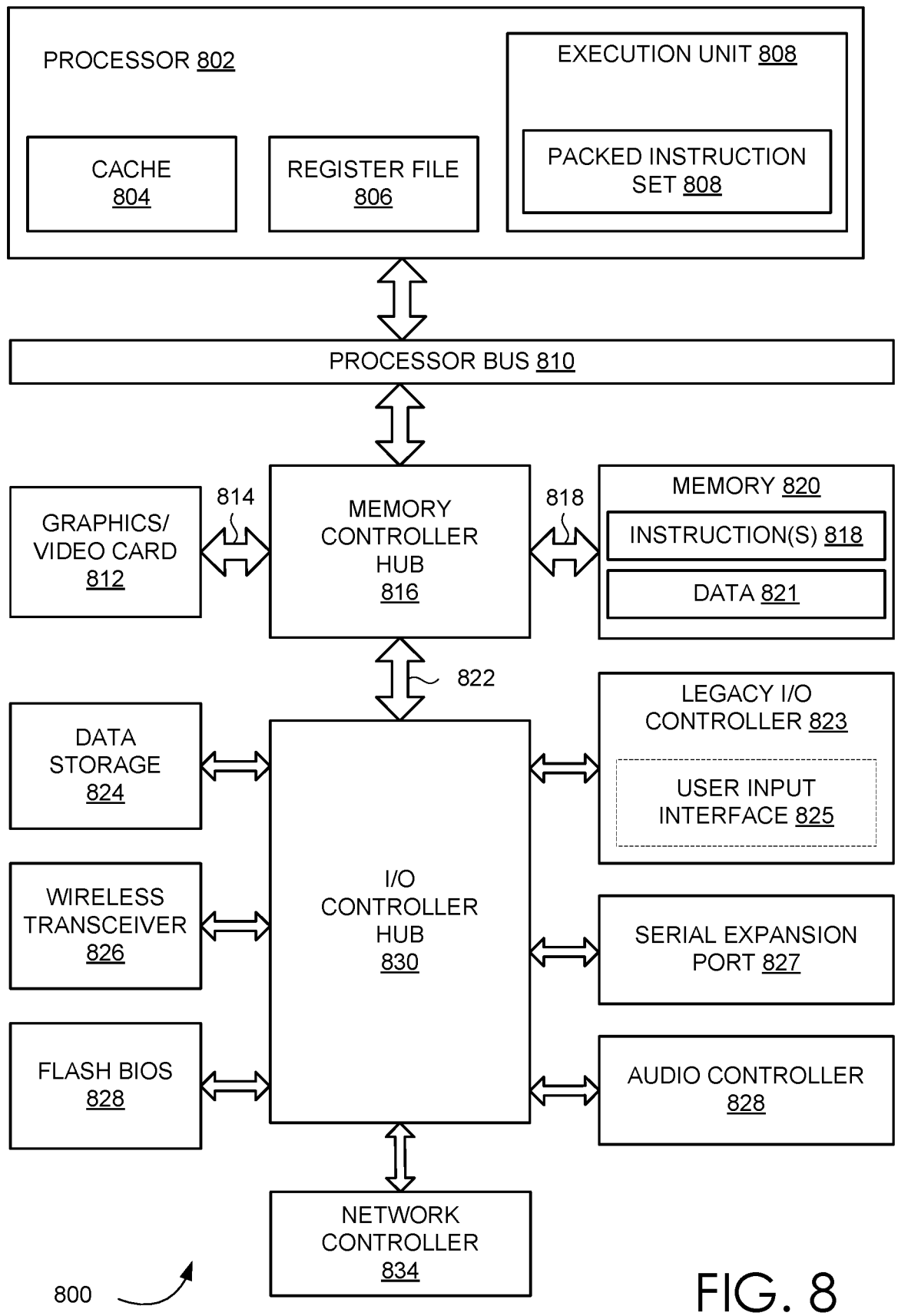
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe)

or some combination thereof. In at least one embodiment, one or more components of computer system 800 are interconnected using compute express link (CXL) interconnects.

Such components can be used to stagger synchronization signals in order to distribute workloads over a set of processors.

Figure 9:
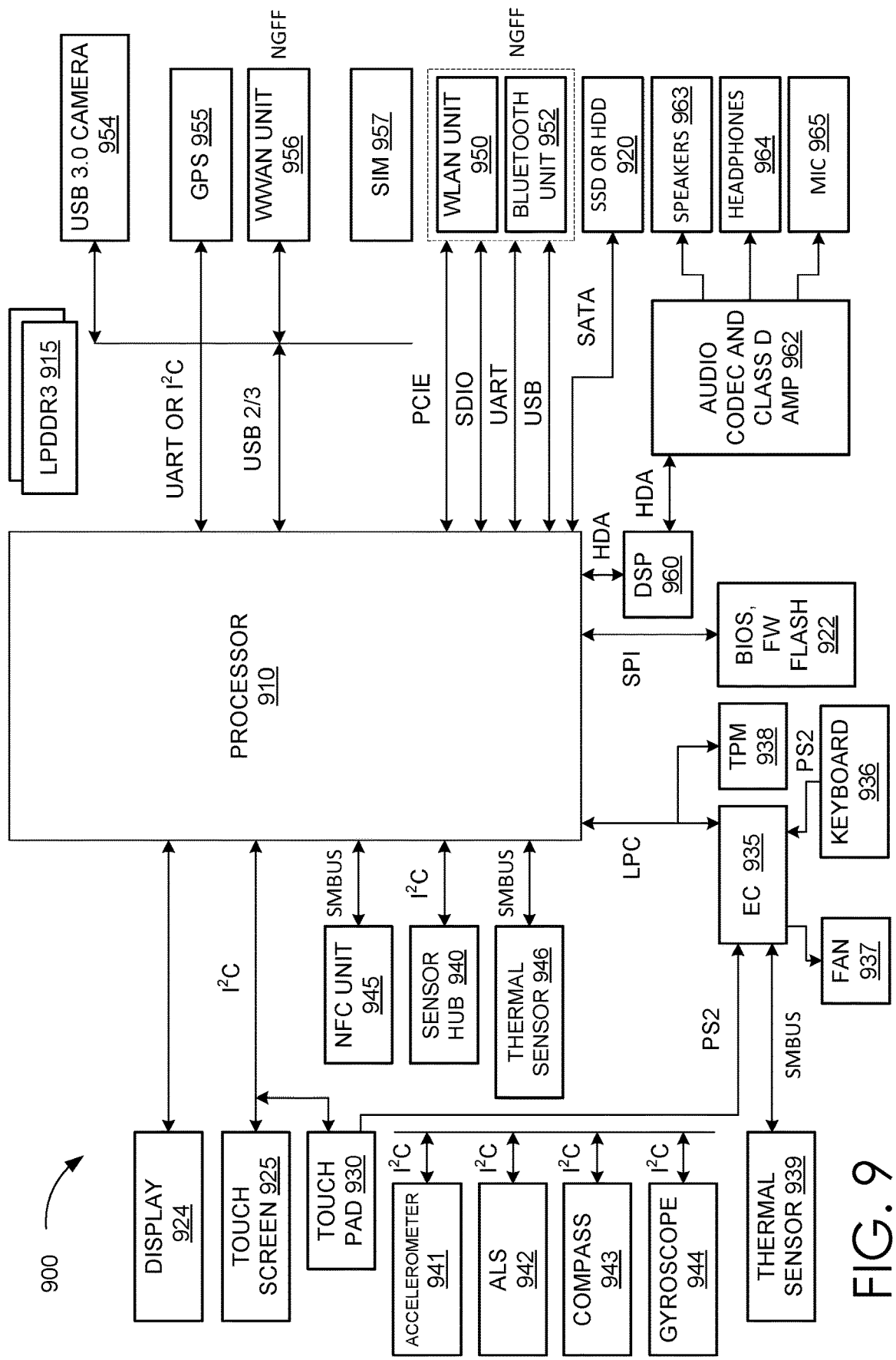
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to stagger synchronization signals in order to distribute workloads over a set of processors. .

Figure 10:
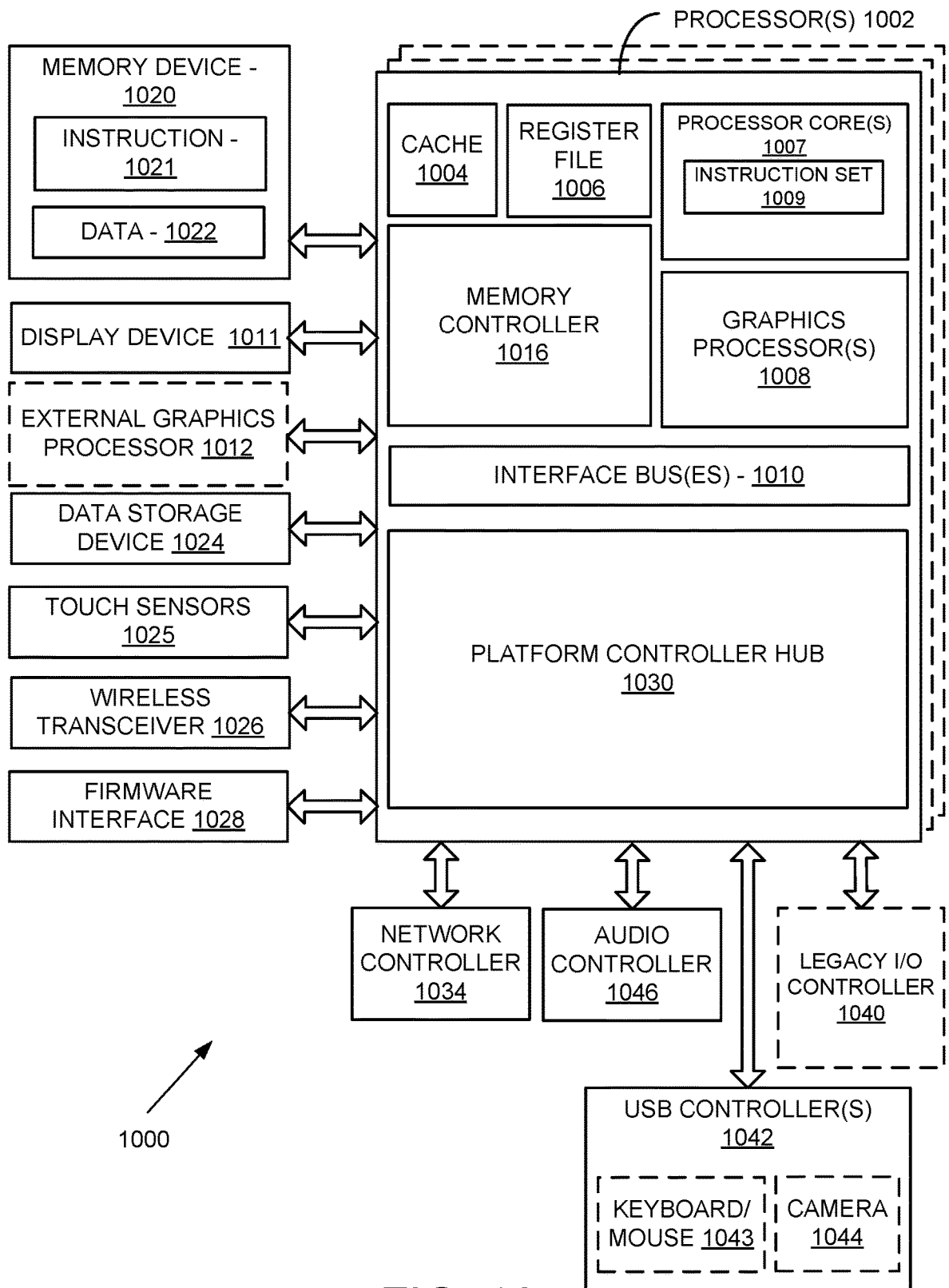
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to stagger synchronization signals in order to distribute workloads over a set of processors.

Figure 11:
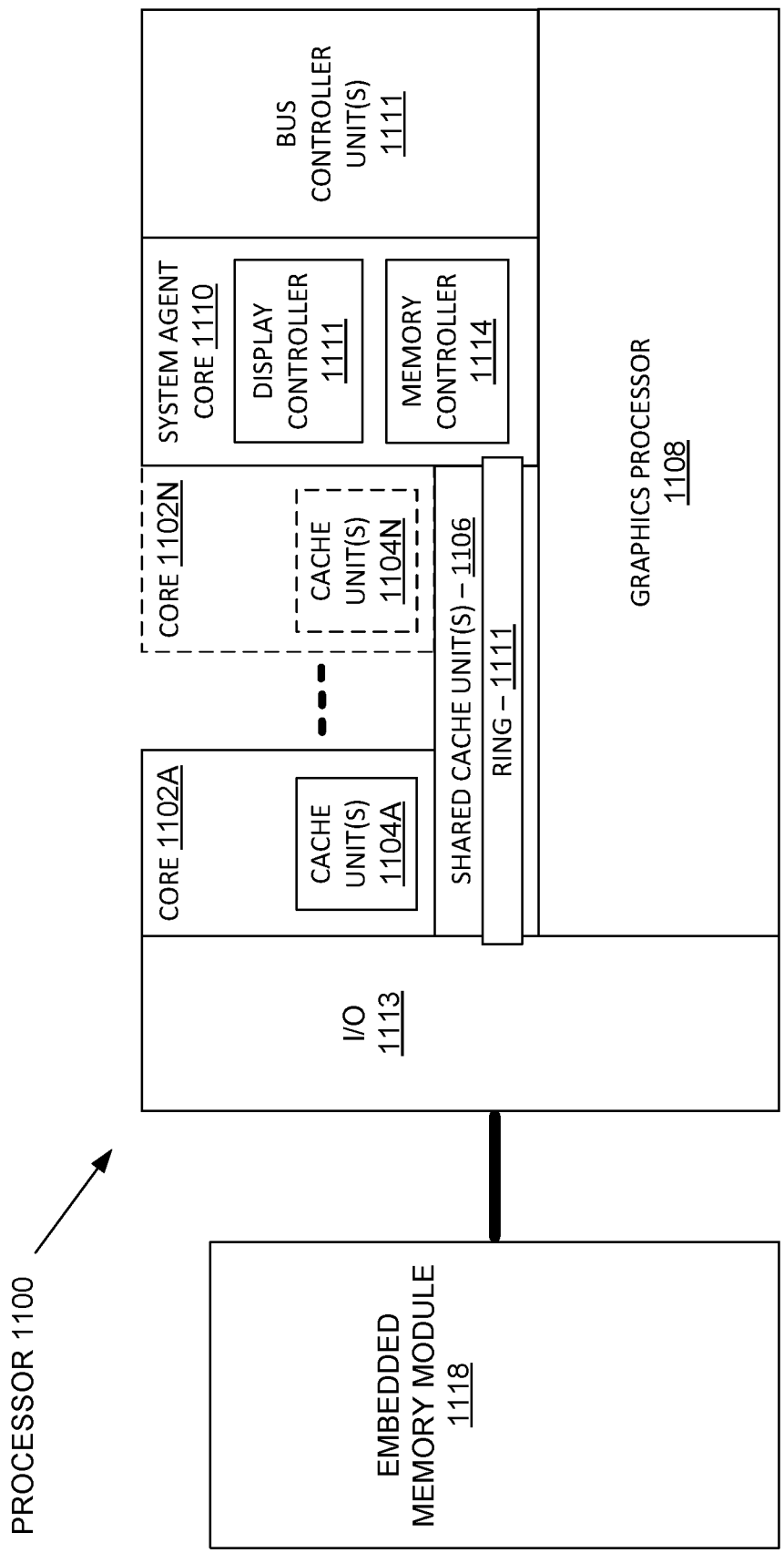
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to stagger synchronization signals in order to distribute workloads over a set of processors.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   for individual streams in a multi-streaming system,
      calculating an initial VSync offset for the stream, wherein the individual streams of the multi-streaming system have different initial VSync offsets within a VSync interval;
      storing the initial VSync offset for the stream;
      scheduling a time to next VSync for the stream using the initial VSync offset; and
      transmitting a signal to perform a VSync operation for the stream when a duration of time equivalent to the time to next VSync has elapsed.

2. The method of claim 1, wherein calculating the initial VSync offset for the stream comprises staggering the initial VSync offset for the stream based on a number of streams in the multi-streaming system without rescheduling the time to next VSync for any other stream in the multi-streaming system.

3. The method of claim 2, wherein calculating the initial VSync offset for the stream comprises:
   determining a largest remaining sub-interval between any two initial VSync offsets in a single VSync interval; and
   assigning the initial VSync offset to be substantially equal to a time halfway between the largest remaining sub-interval.

4. The method of claim 1, wherein each stream corresponds to a separate container corresponding to a separate instance of an operating environment.

5. The method of claim 1, wherein calculating the initial VSync offset for the stream comprises applying a randomizer using a seed initialized based on a value unique to the individual stream.

6. The method of claim 1, wherein calculating the initial VSync offset for the stream comprises:

dividing each processing period by a number of streams corresponding to the multi-streaming system to determine a quotient;

assigning a different stream identifier to each stream; and assigning a different coefficient to each stream identifier, wherein an initial VSync offset for any individual stream of the multi-streaming system is the product of the quotient and the coefficient of the stream identifier corresponding to the individual stream.

7. The method of claim 6, wherein the number of streams corresponding to the multi-streaming system is equal to a number of streams the multi-streaming system is able to support.

8. The method of claim 7, wherein the number of streams the multi-streaming system is able to support exceeds a number of processing units of the multi-streaming system.

9. The method of claim 1, further comprising:

determining a new stream of the multi-streaming system;

calculating an initial VSync offset for the new stream; and maintaining a staggered VSync schedule by dynamically adjusting the initial VSync offset of at least one other stream of the multi-streaming system.

10. The method of claim 1, wherein transmitting the signal to perform a VSync operation is indicative of an availability of a buffer for performing rendering operations associated with the stream.

11. A system, comprising:

a network interface to communicate data over a network with a plurality of client devices over a corresponding plurality of streams; and one or more processing units to perform, for individual streams in the plurality of streams:

calculating an initial VSync offset for the stream in a VSync interval, wherein the individual streams of the plurality of streams have different initial VSync offsets within the VSync interval;

storing the initial VSync offset for the stream;

scheduling a time to next VSync for the stream using the initial VSync offset; and transmitting a signal to perform a VSync operation for the stream when a duration of time equivalent to the time to next VSync has elapsed.

12. The system of claim 11, wherein at least one processing unit of the one or more processing units performs calculating of the initial VSync offset by staggering the initial VSync offset for the stream based on a number of streams in the plurality of streams without rescheduling the time to next VSync for any other stream in the plurality of streams.

13. The system of claim 12, wherein at least one processing unit of the one or more processing units is to perform calculating of the initial VSync offset for the stream by:

determining a largest remaining sub-interval between any two initial VSync offsets in the VSync interval; and assigning the initial VSync offset to be substantially equal to a time halfway between the largest remaining sub-interval.

14. The system of claim 11, wherein each stream corresponds to a separate container corresponding to a separate instance of an operating environment.

15. The system of claim 14, wherein the operating environment comprises an operating system.

16. The system of claim 15, wherein the operating environment further comprises at least one of a driver for the processing unit or an application programming interface (API).

17. The system of claim 11, wherein at least one processing unit of the one or more processing units performs calculating of the initial VSync offset for the stream by applying a randomizer using a seed initialized based on a value unique to the individual stream.

18. The system of claim 11, wherein at least one processing unit of the one or more processing units performs calculating of the initial VSync offset for the stream by:

dividing each processing period by a number of streams corresponding to the plurality of streams to determine a quotient;

assigning a different stream id to each stream; and assigning a different coefficient to each stream id, wherein an initial VSync offset for any individual stream of the plurality of streams is the product of the quotient and the coefficient of the stream id corresponding to the individual stream.

19. The system of claim 18, wherein the number of streams is equal to a number of streams the server is able to support.

20. The system of claim 19, wherein the number of streams the server is able to support exceeds a number of central processing units (CPUs) of the server.

21. The system of claim 11, wherein at least one processing unit of the one or more processing units performs transmitting of the signal to perform a VSync operation when a buffer of the processing unit for performing rendering operations associated with the stream is available.

* * * * *